(12) United States Patent
Patel et al.

(10) Patent No.: US 10,903,996 B2
(45) Date of Patent: Jan. 26, 2021

(54) PERSONA SELECTION USING TRUST SCORING

(71) Applicant: MICROSOFT TECHNOLOGY LICENSING, LLC, Redmond, WA (US)

(72) Inventors: Ankur Patel, Sammamish, WA (US); Daniel James Buchner, Los Gatos, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 335 days.

(21) Appl. No.: 15/994,331

(22) Filed: May 31, 2018

(65) Prior Publication Data

US 2019/0229914 A1 Jul. 25, 2019

Related U.S. Application Data

(60) Provisional application No. 62/620,300, filed on Jan. 22, 2018, provisional application No. 62/626,564, filed on Feb. 5, 2018.

(51) Int. Cl.
*H04L 9/08* (2006.01)
*G06F 16/901* (2019.01)
(Continued)

(52) U.S. Cl.
CPC ...... *H04L 9/0894* (2013.01); *G06F 16/24578* (2019.01); *G06F 16/907* (2019.01);
(Continued)

(58) Field of Classification Search
None
See application file for complete search history.

(56) References Cited

U.S. PATENT DOCUMENTS 7,552,469 B2 6/2009 Diffie et al.
7,761,425 B1 7/2010 Erickson et al.
(Continued)

FOREIGN PATENT DOCUMENTS

CN 107480986 A 12/2017
EP 0534420 A2 3/1993
(Continued)

OTHER PUBLICATIONS

"International Search Report and Written Opinion Issued in PCT Application No. PCT/US19/013558", dated Apr. 9, 2019, 12 Pages.
(Continued)

*Primary Examiner* — Joseph P Hirl
*Assistant Examiner* — Hassan Saadoun
(74) *Attorney, Agent, or Firm* — Workman Nydegger

(57) ABSTRACT

Selecting a persona for a Decentralized Identifier (DID) and associated DID document based on a trust score. A request for data or services associated with an owner of various decentralized identifiers (DID) is received. Each of the plurality of DIDs may have an associated DID document. The associated DID document for each of the DIDs defines a persona based on an amount of identifying information included in the DID document. Based on the received request, a trust score is assigned to an entity that generated the received request. The trust score is at least partially based on the verifiability of an identity of the entity that generated the received request. Based on the trust score, the persona and the associated DID and DID document that should be used by the owner for interacting with the entity that generated the request is selected.

20 Claims, 6 Drawing Sheets

(51) Int. Cl.
| | |
|---|---|
| *H04L 9/32* | (2006.01) |
| *G06F 16/2457* | (2019.01) |
| *H04L 29/06* | (2006.01) |
| *G06Q 20/36* | (2012.01) |
| *G06Q 20/38* | (2012.01) |
| *G06F 21/45* | (2013.01) |
| *G06F 21/33* | (2013.01) |
| *G06F 16/907* | (2019.01) |
| *H04L 9/06* | (2006.01) |
| *H04L 9/14* | (2006.01) |
| *H04L 9/30* | (2006.01) |
| *G06F 21/62* | (2013.01) |

(52) U.S. Cl.
CPC .......... *G06F 16/9014* (2019.01); *G06F 21/33* (2013.01); *G06F 21/45* (2013.01); *G06F 21/6218* (2013.01); *G06Q 20/3674* (2013.01); *G06Q 20/3821* (2013.01); *G06Q 20/3829* (2013.01); *H04L 9/0637* (2013.01); *H04L 9/083* (2013.01); *H04L 9/0869* (2013.01); *H04L 9/0891* (2013.01); *H04L 9/14* (2013.01); *H04L 9/30* (2013.01); *H04L 9/321* (2013.01); *H04L 9/3236* (2013.01); *H04L 9/3239* (2013.01); *H04L 9/3247* (2013.01); *H04L 63/08* (2013.01); *H04L 63/102* (2013.01); *H04L 63/20* (2013.01); *G06F 2221/2131* (2013.01); *G06F 2221/2141* (2013.01); *H04L 2209/38* (2013.01)

(56) References Cited

U.S. PATENT DOCUMENTS

| | | | |
|---|---|---|---|
| 7,827,147 | B1 | 11/2010 | D'Hoye et al. |
| 8,245,271 | B2 | 8/2012 | Chan et al. |
| 8,566,952 | B1 | 10/2013 | Michaels |
| 8,769,271 | B1 | 7/2014 | Osmond et al. |
| 8,931,054 | B2 | 1/2015 | Huynh et al. |
| 9,251,114 | B1 | 2/2016 | Ancin et al. |
| 9,424,400 | B1 | 8/2016 | Blankenbeckler et al. |
| 9,959,522 | B2 | 5/2018 | Kenna et al. |
| 9,992,028 | B2 | 6/2018 | Androulaki et al. |
| 2002/0156726 | A1 | 10/2002 | Kleckner et al. |
| 2003/0070072 | A1 | 4/2003 | Nassiri |
| 2006/0212931 | A1* | 9/2006 | Shull ............... H04L 63/104 726/10 |
| 2007/0245149 | A1 | 10/2007 | Lin |
| 2007/0252001 | A1 | 11/2007 | Kail et al. |
| 2009/0158041 | A1 | 6/2009 | Kang et al. |
| 2009/0300723 | A1 | 12/2009 | Nemoy et al. |
| 2009/0300742 | A1 | 12/2009 | Ahn |
| 2010/0145997 | A1 | 6/2010 | Zur et al. |
| 2010/0199098 | A1 | 8/2010 | King |
| 2015/0172286 | A1 | 6/2015 | Tomlinson et al. |
| 2016/0275309 | A1 | 9/2016 | Austin et al. |
| 2017/0155515 | A1 | 6/2017 | Androulaki et al. |
| 2017/0180128 | A1 | 6/2017 | Lu |
| 2017/0222814 | A1* | 8/2017 | Oberhauser ...... G11B 20/00086 |
| 2017/0317833 | A1 | 11/2017 | Smith et al. |
| 2017/0317834 | A1 | 11/2017 | Smith et al. |
| 2018/0307853 | A1 | 10/2018 | Mehta et al. |
| 2019/0228406 | A1 | 7/2019 | Patel et al. |
| 2019/0229909 | A1 | 7/2019 | Patel et al. |
| 2019/0230073 | A1 | 7/2019 | Patel et al. |
| 2019/0230092 | A1 | 7/2019 | Patel et al. |

FOREIGN PATENT DOCUMENTS

| | | |
|---|---|---|
| WO | 2010019916 A1 | 2/2010 |
| WO | 2017145049 A1 | 8/2017 |

OTHER PUBLICATIONS

"International Search Report and Written Opinion Issued in PCT Application No. PCT/US19/013559", dated Apr. 8, 2019, 11 Pages.

"International Search Report and Written Opinion Issued in PCT Application No. PCT/US19/013560", dated Apr. 8, 2019, 11 Pages.

"International Search Report and Written Opinion Issued in PCT Application No. PCT/US19/013562", dated Apr. 16, 2019, 6 Pages.

"Notice of Allowance issued in U.S. Appl. No. 15/994,893", dated Mar. 26, 2020, 13 Pages.

Tang, et al., "Efficient Multi-Party Digital Signature Using Adaptive Secret Sharing for Low-Power Devices in Wireless Networks", In Proceedings of IEEE Transactions on Wireless Communications vol. 8 , Issue: 2, Feb. 20, 2009, pp. 882-889.

"Non Final Office Action Issued in U.S. Appl. No. 15/994,900", dated May 20, 2020, 25 Pages.

Antonopoulos, Andreasm., "Mastering Bitcoin", In Publication of O'Reilly Media, Inc, Dec. 2014, pp. 88-99.

White, Ron, "How Computers Work", In Book of "How Computers Work", Seventh Edition, Published by Que, Oct. 2003, 23 Pages.

"Creative Commons", Retrieved from: https://creativecommons.org/licenses/by/3.0/, Retrieved on Jan. 22, 2018, 1 Page.

"Flaticon", Retrieved from: https://www.flaticon.com/, Retrieved on Jan. 22, 2018, 14 Pages.

"Freepik", Retrieved from: https://www.freepik.com/, Retrieved on Jan. 22, 2018, 18 Pages.

"Non Final Office Action Issued in U.S. Appl. No. 15/994,337", dated Feb. 3, 2020, 8 Pages.

"Non Final Office Action Issued in U.S. Appl. No. 15/994,893", dated Jan. 7, 2020, 33 Pages.

Gutoski, et al., "Hierarchical Deterministic Bitcoin Wallets that Tolerate Key Leakage", In Proceedings of International Conference on Financial Cryptography and Data Security, Jan. 26, 2015, 9 Pages.

"International Search report Issued in PCT Application No. PCT/US2019/013561", dated Jul. 3, 2019, 12 Pages.

"Final Office Action Issued in U.S. Appl. No. 15/994,900", dated Nov. 5, 2020, 37 Pages.

* cited by examiner

PERSONA SELECTION USING TRUST SCORING

CROSS-REFERENCE TO RELATED APPLICATIONS

This application claims the benefit of and priority to U.S. Provisional Patent Application Ser. No. 62/620,300 filed on Jan. 22, 2018, entitled "Decentralized Identity Platform," and U.S. Provisional Patent Application Ser. No. 62/626,564 filed on Feb. 5, 2018, entitled "Decentralized Identity Platform", both of which applications are expressly incorporated herein by reference in their entireties.

BACKGROUND

Most of currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity. Decentralized Identifiers (DIDs) are a new type of identifier, which are independent from any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of ledger, which provides a fairly secure platform. In a broader sense, a DID may further include a DID method specifying how a client may register, replace, rotate, and/or recover a key. The DID method may also set a key expiration date.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems, computer program products, and methods for selecting a persona for a Decentralized Identifier (DID) and associated DID document based on a trust score. In the embodiment a request for data or services associated with an owner of various decentralized identifiers (DID) is received. Each of the plurality of DIDs may have an associated DID document. The associated DID document for each of the DIDs defines a persona based on an amount of identifying information included in the DID document. Based on the received request, a trust score is assigned to an entity that generated the received request. The trust score is at least partially based on the verifiability of an identity of the entity that generated the received request. Based on the trust score, the persona and the associated DID and DID document that should be used by the owner for interacting with the entity that generated the request is selected.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
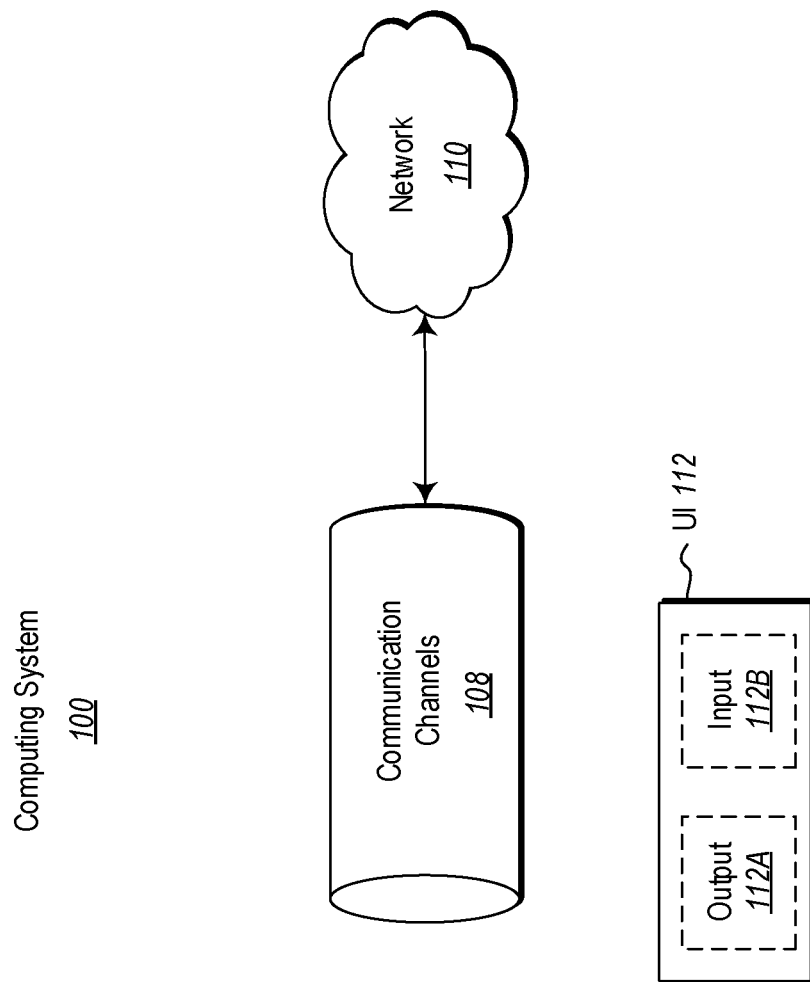
FIG. 1 illustrates an example computing system in which the principles described herein may be employed.
Figure 1:
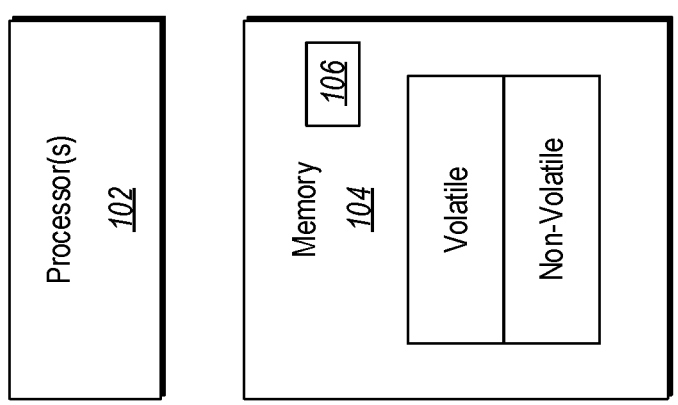

Embodiments disclosed herein are related to computing systems, computer program products, and methods for selecting a persona for a Decentralized Identifier (DID) and associated DID document based on a trust score. In the embodiment a request for data or services associated with an owner of various decentralized identifiers (DID) is received. Each of the plurality of DIDs may have an associated DID document. The associated DID document for each of the DIDs defines a persona based on an amount of identifying information included in the DID document. Based on the received request, a trust score is assigned to an entity that generated the received request. The trust score is at least partially based on the verifiability of an identity of the entity that generated the received request. Based on the trust score, the persona and the associated DID and DID document that should be used by the owner for interacting with the entity that generated the request is selected.

This represents a technical advance over existing systems as the DID owner no longer needs to determine which persona would be the best to use for interaction with a given third party entity. Instead the embodiments disclosed herein are able to generate the trust score based on the verifiability of the identity of the third party and/or the purpose of the request for data and services. The embodiments disclosed herein are then able to recommend the most appropriate persona to use for interacting with the third party entity. Thus, the DID owner need only accept the recommendation and does not need to make the selection based on study or other actions by the DID owner. This may help prevent a persona that is not the most appropriate from being used for the interaction since the DID owner may improperly select a persona to use if the embodiments disclosed herein did not recommend the most appropriate persona.

Because the principles described herein may be performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Decentralized Identification (DID)

Figure 2:
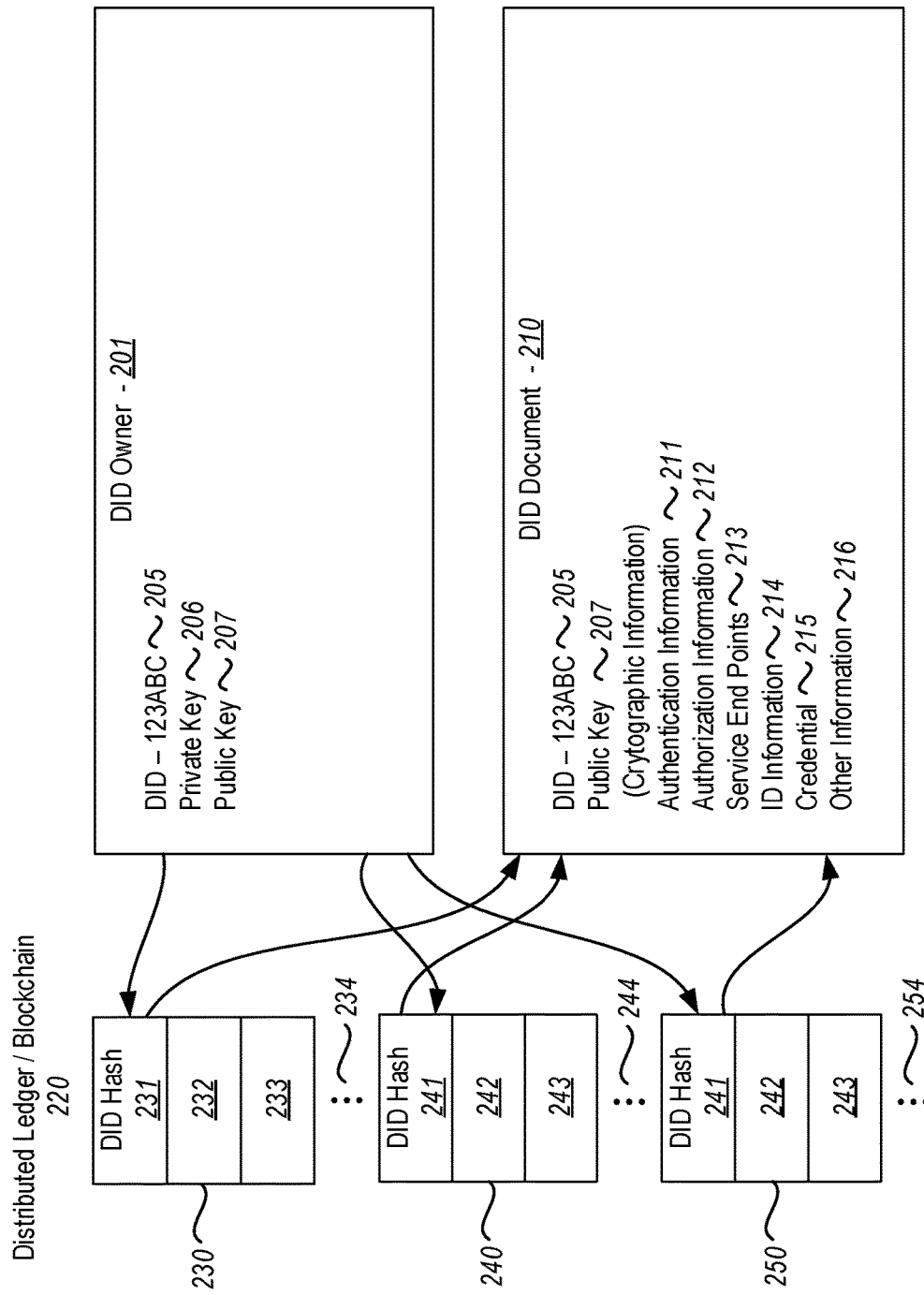
FIG. 2 illustrates an example environment for creating a Decentralized Identification (DID).

Some introductory discussion of a decentralized identification (DID) and the environment is which they are created and reside will now be given with respect to FIG. 2. As illustrated in FIG. 2, a DID owner 201 may own or control a DID 205 that represents an identity of the DID owner 201. The DID owner 201 may register a DID using a creation and registration service, which will be explained in more detail below.

The DID owner 201 may be any entity that could benefit from a DID. For example, the DID owner 201 may be a human being or an organization of human beings. Such organizations might include a company, department, government, agency, or any other organization or group of organization. Each individual human being might have a DID while the organization(s) to which each belongs might likewise have a DID.

The DID owner 201 may alternatively be a machine, system, or device, or a collection of machine(s), device(s) and/or system(s). In still other embodiments, the DID owner 201 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 106 described above with respect to FIG. 1. An example of a complex executable component 106 might be an artificial intelligence. An artificial intelligence may also own a DID.

Thus, the DID owner 201 may be any reasonable entity, human or non-human, that is capable of creating the DID 205 or at least having the DID 205 created for and associated with them. Although the DID owner 201 is shown as having a single DID 205, this need not be the case as there may be any number of DIDs associated with the DID owner 201 as circumstances warrant.

As mentioned, the DID owner 201 may create and register the DID 205. The DID 205 may be any identifier that may be associated with the DID owner 201. Preferably, that identifier is unique to that DID owner 201, at least within a scope in which the DID is anticipated to be in use. As an example, the identifier may be a locally unique identifier, and perhaps more desirably a globally unique identifier for identity systems anticipated to operate globally. In some embodiments, the DID 205 may be a Uniform Resource Identifier (URI) (such as a Uniform Resource Locator (URL)) or other pointer that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein) Accordingly, the DID 205 may be any identifier that is under the control of the DID owner 201 and independent of any centralized authority.

In some embodiments, the structure of the DID 205 may be as simple as a user name or some other human understandable term. However, in other embodiments, the DID 205 may preferably be a random string of number and letters for increased security. In one embodiment, the DID 205 may be a string of 128 letters and numbers. Accordingly, the embodiments disclosed herein are not dependent on any specific implementation of the DID 205. In a very simple example, the DID 205 is shown as "123 ABC".

As also shown in FIG. 2, the DID owner 201 has control of a private key 206 and public key 207 pair that are associated with the DID 205. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair may be generated on a device controlled by the DID owner 201. Thus, the private key 206 and public key 207 pair should not be generated on a server controlled by any centralized authority as this may cause the private key 206 and public key 207 pair to not be fully under the control of the DID owner 201 at all times. Although FIG. 2 and this description have described a private and public key pair, it will also be noted that other types of reasonable cryptographic information and/or mechanisms may also be used as circumstances warrant.

FIG. 2 also illustrates a DID document 210 that is associated with the DID 205. As will be explained in more detail to follow, the DID document 210 may be generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 may be implemented according to methods specified by a distributed ledger 220 that will be used to store a representation of the DID 205 as will be explained in more detail to follow. Thus, the DID document 210 may have different methods depending of the specific distributed ledger.

The DID document 210 also includes the public key 207 created by the DID owner 201 or some other equivalent cryptographic information. The public key 207 may be used by third party entities that are given permission by the DID owner 201 to access information and data owned by the DID owner 201. The public key 207 may also be used by verify that the DID owner 201 in fact owns or controls the DID 205.

The DID document 210 may also include authentication information 211. The authentication information 211 may specify one or more mechanisms by which the DID owner 201 is able to prove that the DID owner 201 owns the DID 205. In other words, the mechanisms of authentication information 211 may show proof of a binding between the DID 205 (and thus it's DID owner 201) and the DID document 210. In one embodiment, the authentication information 211 may specify that the public key 207 be used in a signature operation to prove the ownership of the DID 205. Alternatively or in addition, the authentication information 211 may specify that the public key 207 be used in a biometric operation to prove ownership of the DID 205. Accordingly, the authentication information 211 may include any number of mechanisms by which the DID owner 201 is able to prove that the DID owner 201 owns the DID 205.

The DID document 210 may also include authorization information 212. The authorization information 212 may allow the DID owner 201 to authorize third party entities the rights to modify the DID document 210 or some part of the document without giving the third party the right to prove ownership of the DID 205. For example, the authorization information 212 may allow the third party to update any designated set of one or more fields in the DID document 210 using any designated update mechanism. Alternatively, the authorization information may allow the third party to limit the usages of DID 205 by the DID owner 201 for a specified time period. This may be useful when the DID owner 201 is a minor child and the third party is a parent or guardian of the child. The authorization information 212 may allow the parent or guardian to limit use of the DID 201 until such time as the child in no longer a minor.

The authorization information 212 may also specify one or more mechanisms that the third party will need to follow to prove they are authorized to modify the DID document 210. In some embodiments, these mechanism may be similar to those discussed previously with respect to the authentication information 211.

The DID document 210 may also include one or more service endpoints 213. A service endpoint may include a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers may be used by the DID owner 201 or by third party entities to access the services that operate on behalf of the DID owner 201. Specific examples of service endpoints 213 will be explained in more detail to follow.

The DID document 210 may further include identification information 214. The identification information 214 may include personally identifiable information such as the name, address, occupation, family members, age, hobbies, interests, or the like DID owner 201. Accordingly, the identification information 214 listed in the DID document 210 may represent a different persona of the DID owner 201 for different purposes. For instance, a persona may be pseudo anonymous, e.g., the DID owner 201 may include a pen name in the DID document when identifying him or her as a writer posting articles on a blog; a persona may be fully anonymous, e.g., the DID owner 201 may only want to disclose his or her job title or other background data (e.g., a school teacher, an FBI agent, an adult older than 21 years old, etc.) but not his or her name in the DID document; and a persona may be specific to who the DID owner 201 is as an individual, e.g., the DID owner 201 may include information identifying him or her as a volunteer for a particular charity organization, an employee of a particular corporation, an award winner of a particular award, etc.

The DID document 210 may also include credential information 215. The credential information 215 may be any information that is associated with the DID owner 201's background. For instance, the credential information 215 may be (but not limited to) a qualification, an achievement, a government ID, a government right such as a passport or a driver's license, a payment provider or bank account, a university degree, a work history, or any other information about the DID owner 201's background.

The DID document 210 may also include various other information 216. In some embodiments, the other information 216 may include metadata specifying when the DID document 210 was created and/or when it was last modified. In other embodiments, the other information 216 may include cryptographic proofs of the integrity of the DID document 210. In still further embodiments, the other information 216 may include additional information that is either specified by the specific method implementing the DID document or desired by the DID owner 201.

FIG. 2 also illustrates a distributed ledger or blockchain 220. The distributed ledger 220 may be any decentralized, distributed network that includes various computing systems that are in communication with each other. For example, the distributed ledger 220 may include a first distributed portion 230, a second distributed portion 240, a third distributed portion 250, and any number of additional distributed portions as illustrated by the ellipses 260. The distributed ledger or blockchain 220 may operate according to any known standards or methods for distributed ledgers. Examples of conventional distributed ledgers that may correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 may be stored on the actual distributed ledger. Alternatively, in other embodiments the DID document 210 may be stored in a data storage (not illustrated) that is associated with the distributed ledger or blockchain 220.

As mentioned, a representation of the DID 205 is stored on each portion of the distributed ledger or blockchain 220. For example, in FIG. 2 this is shown as the DID hash 231, DID hash 241, and DID hash 251, which are ideally identical copies of the same DID. The DID hash 231, DID hash 241, and DID hash 251 may then point to the location of the DID document 210. The distributed ledger or blockchain 220 may also store numerous other representations of other DIDs as illustrated by references 232, 233, 234, 242, 243, 244, 252, 253, and 254.

In one embodiment, when the DID user 201 creates the DID 205 and the associated DID document 210, the DID hash 231, DID hash 241, and DID hash 251 are written to the distributed ledger or blockchain 220. The distributed ledger or blockchain 220 thus records that the DID 205 now exits. Since the distributed ledger or blockchain 220 is decentralized, the DID 205 is not under the control of any entity outside of the DID owner 201. The DID hash 231, DID hash 241, and DID hash 251 may include, in addition to the pointer to the DID document 210, a record or time stamp that specifies when the DID 205 was created. At a later date when modifications are made to the DID document 210, this may also be recorded in DID hash 231, DID hash 241, and DID hash 251. The DID hash 231, DID hash 241, and DID hash 251 may further include a copy of the public key 207 so that the DID 205 is cryptographically bound to the DID document 210.

DID Lifecycle Management

Figure 3:
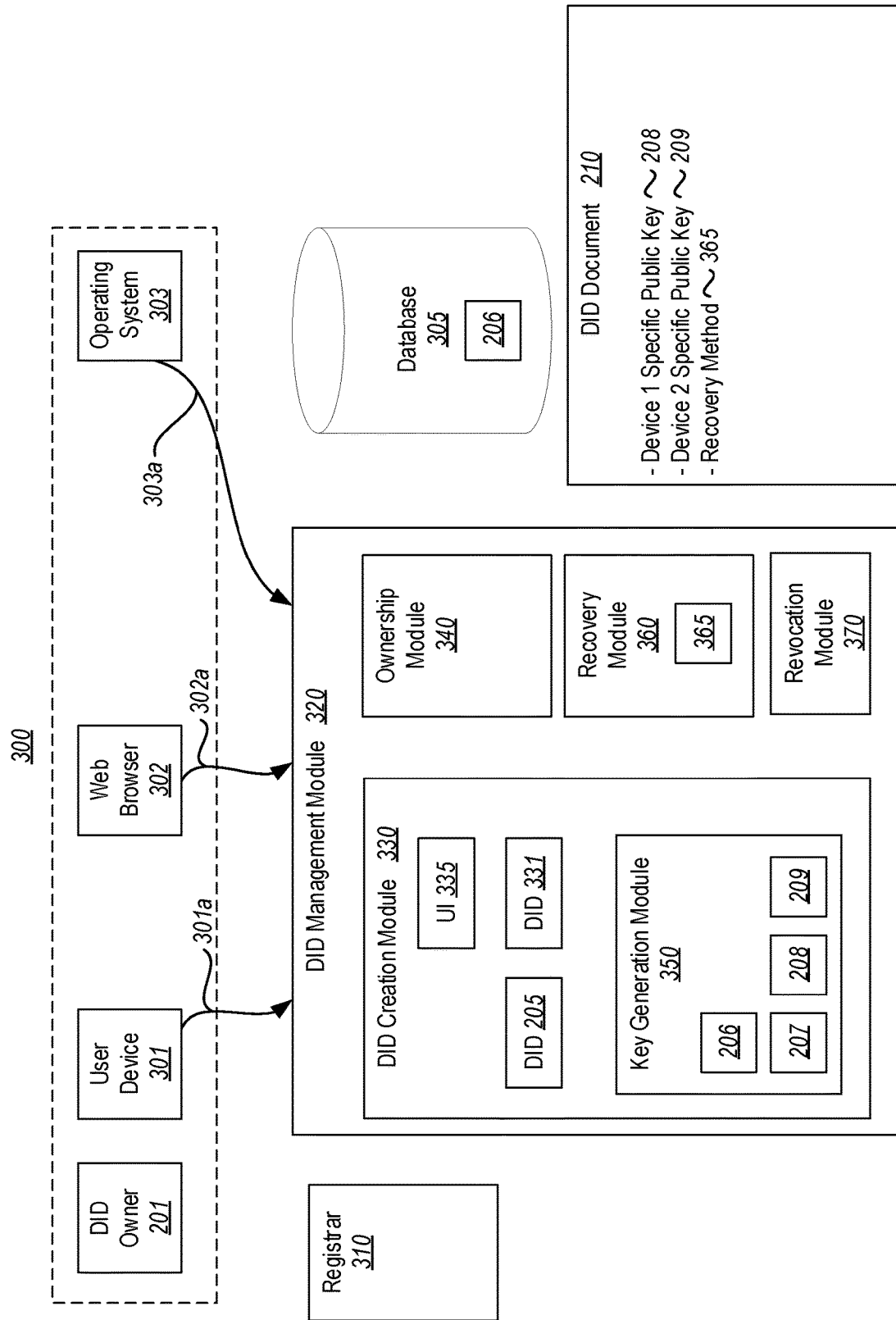
FIG. 3 illustrates an example environment for various DID lifecycle management operations and services.

Having described DIDs and how they operate generally with reference to FIG. 2, specific embodiments of DIDs will now be explained. Turning to FIG. 3, an environment 300 that may be used to perform various DID lifecycle management operations and services will now be explained. It will be appreciated that the environment of FIG. 3 may reference elements from FIG. 2 as needed for ease of explanation.

As shown in FIG. 3, the environment 300 may include various devices and computing systems that may be owned or otherwise under the control of the DID owner 201. These may include a user device 301. The user device 301 may be, but is not limited to, a mobile device such as a smart phone, a computing device such as a laptop computer, or any device such as a car or an appliance that includes computing abilities. The devices 301 may include a web browser 302 operating on the device and an operating system 303 operating the device. More broadly speaking, the dashed line 304 represents that all of these devices may be owned or otherwise under the control of the DID owner 201.

The environment 300 also includes a DID lifecycle management module 320. It will be noted that in operation, the DID lifecycle management module 320 may reside on and be executed by one or more of user device 301, web browser 302, and the operating system 303 as illustrated by the lines

301*a*, 302*a*, and 303*a*. Accordingly, DID lifecycle management module 320 is shown as being separate for ease of explanation.

As shown in FIG. 3, the DID lifecycle management module 320 includes a DID creation module 330. The DID creation module 330 may be used by the DID owner 201 to create the DID 205 or any number of additional DIDs, such as DID 331. In one embodiment, the DID creation module may include or otherwise have access to a User Interface (UI) element 335 that may guide the DID owner 201 in creating the DID 205. The DID creation module 330 may have one or more drivers that are configured to work with specific distributed ledgers such as distributed ledger 220 so that the DID 205 complies with the underlying methods of that distributed ledger.

A specific embodiment will now be described. For example, the UI 335 may provide a prompt for the user to enter a user name or some other human recognizable name. This name may be used as a display name for the DID 205 that will be generated. As previously described, the DID 205 may be a long string of random numbers and letters and so having a human recognizable name for a display name be advantageous. The DID creation module 330 may then generate the DID 205. In the embodiments having the UI 335, the DID 205 may be shown in a listing of identities and may be associated with the human recognizable name.

The DID creation module may also include a key generation module 350. The key generation module may generate the private key 206 and public key 207 pair previously described. The DID creation module 330 may then use the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record the DID hash 231, DID hash 241, and DID hash 251 in the distributed ledger in the manner previously described and to store the DID document 210 in the manner previously described. This process may use the public key 207 in the hash generation.

In some embodiments, the DID lifecycle management module 320 may include an ownership module 340. The ownership module 340 may provide mechanisms that ensure that the DID owner 201 is aware that the DID owner 201 is in sole control of the DID 205. In this way, the provider of the DID lifecycle management module 320 is able to ensure that the provider does not control the DID 205, but is only providing the management services.

As previously discussed, the key generation module 350 generates the private key 206 and public key 207 pair and the public key 207 is then recorded in the DID document 210. Accordingly, the public key 207 may be used by all devices associated with the DID owner 201 and all third parties that desire to provide services to the DID owner 201. Accordingly, when the DID owner 201 desires to associate a new device with the DID 205, the DID owner 201 may execute the DID creation module 330 on the new device. The DID creation module 330 may then use the registrar 310 to update the DID document 210 to reflect that the new device is now associated with the DID 205 and this would be reflected in an updated transaction on the distributed ledger 220 as previously described.

In some embodiments, however, it may be advantageous to have a public key per device 301 owned by the DID owner 201 as this may allow the DID owner 201 to sign with the specific device public key without having to access a general public key. In other words, since the DID owner 201 will use different devices at different times (for example using a mobile phone one instance and then using a laptop computer in another instance) it is advantageous to have a key associated with each device to provide efficiencies in signing using the keys. Accordingly, in such embodiments the key generation module may generate additional public keys 208 and 209 when the additional devices execute the DID creation module 330. These additional public keys may be associated with private key 206 or in some instances may be paired with a new private key.

In those embodiments where the additional public keys 208 and 209 are associated with different devices, the additional public keys 208 and 209 may be recorded in the DID document 210 as being associated with those devices. This is shown in FIG. 3. It will be appreciated that the DID documents 210 may include the information previously described in relation to FIG. 2 in addition to the information shown in FIG. 3. If the DID document 210 existed prior to the device specific public keys being generated, then the DID document 210 would be updated by the creation module 330 via the registrar 310 and this would be reflected in an updated transaction on the distributed ledger 220.

In some embodiments, the DID owner 201 may desire to keep the association of a device with a public key or even with the DID 205 a secret. Accordingly, the DID creation module 330 may cause that such data be secretly shown in the DID document 210.

As described thus far, the DID 205 has been associated with all the devices under the control of the DID owner 201, even when the devices have their own public keys. However, in some embodiments it may be useful for each device or some subset of devices under the control of the DID owner 201 to each have their own DID. Thus, in some embodiments the DID creation module 330 may generate an additional DID, for example DID 331, for each device. The creation module would then generate private and public key pairs and DID documents for each of the devices and have them recorded on the distributed ledger 220 in the manner previously described. Such embodiments may be advantageous for devices that may change ownership as it may be possible to associate the specific device DID to the new owner of the device by granting the new owner authorization rights in the DID document and revoking such rights from the old owner.

As mentioned, the private key, to ensure that it is totally in the control of the DID owner 201, is created on the user device 301, browser 302, or operating system 303 owned or controlled by the DID owner 201 that executed the DID management module 320. In this way, there is little chance that a third party may gain control of the private key 206, especially the provider of the DID lifecycle management module 320. However, there is a chance that the device storing the private key 206 may be lost by the DID owner 201, which may cause the DID owner 201 to lose access to the DID 205. Accordingly, in some embodiments the UI 335 may include the option to allow the DID owner 201 to export the private key 206 to an off device secured database 305 that is under the control of the DID owner 201. In some embodiments, the private key 206 may be stored as a QR code that may scanned by the DID owner 201.

In other embodiments, the DID lifecycle management module 320 may include a recovery module 360 that may be used to recover a lost private key 206. In operation, the recovery module 360 allows the DID owner 201 to select one or more recovery mechanisms 365 at the time the DID 205 is created that may later be used to recover the lost private key. In those embodiments having the UI 335, the UI 335 may allow the DID owner 201 to provide required information that will be needed by the one or more recovery mechanisms 365 when the recovery mechanisms are implemented. The recovery module may then be run on any device associated with the DID 205.

In one embodiment, the selected recovery mechanism may be stored as part of the DID document 210 as shown in FIG. 3. In such embodiments, when a recovery process is needed, the DID owner 201 may use the recovery module to access the recovery mechanism 365 from the DID document 210. The DID owner 201 may then provide the required information and the recovery mechanism 365 will recover the key. Specific embodiments of the recovery mechanisms 365 will described in more detail to follow.

In other embodiments, the selected recovery mechanism 365 may be stored in a secure storage, such as the database 305. Alternatively, the selected recovery mechanism 365 may be hosted by a third party such as the provider of the DID lifecycle management module 320. In such embodiments, the recovery module 360 may access the secure storage or the third party and may then provide the required information so that the key is recovered.

The DID lifecycle management module 320 may also include a revocation module 370 that is used to revoke or sever a device from the DID 205. In operation, the revocation module may use the UI element 335, which may allow the DID owner 201 to indicate a desire to remove a device from being associated with the DID 205. In one embodiment, the revocation module may access the DID document 210 and may cause that all references to the device be removed from the DID document. Alternatively, the public key for the device may be removed. This change in the DID document 210 may then be reflected as an updated transaction on the distributed ledger 220 as previously described.

Decentralized Storage—Identity Hubs

Figure 4:
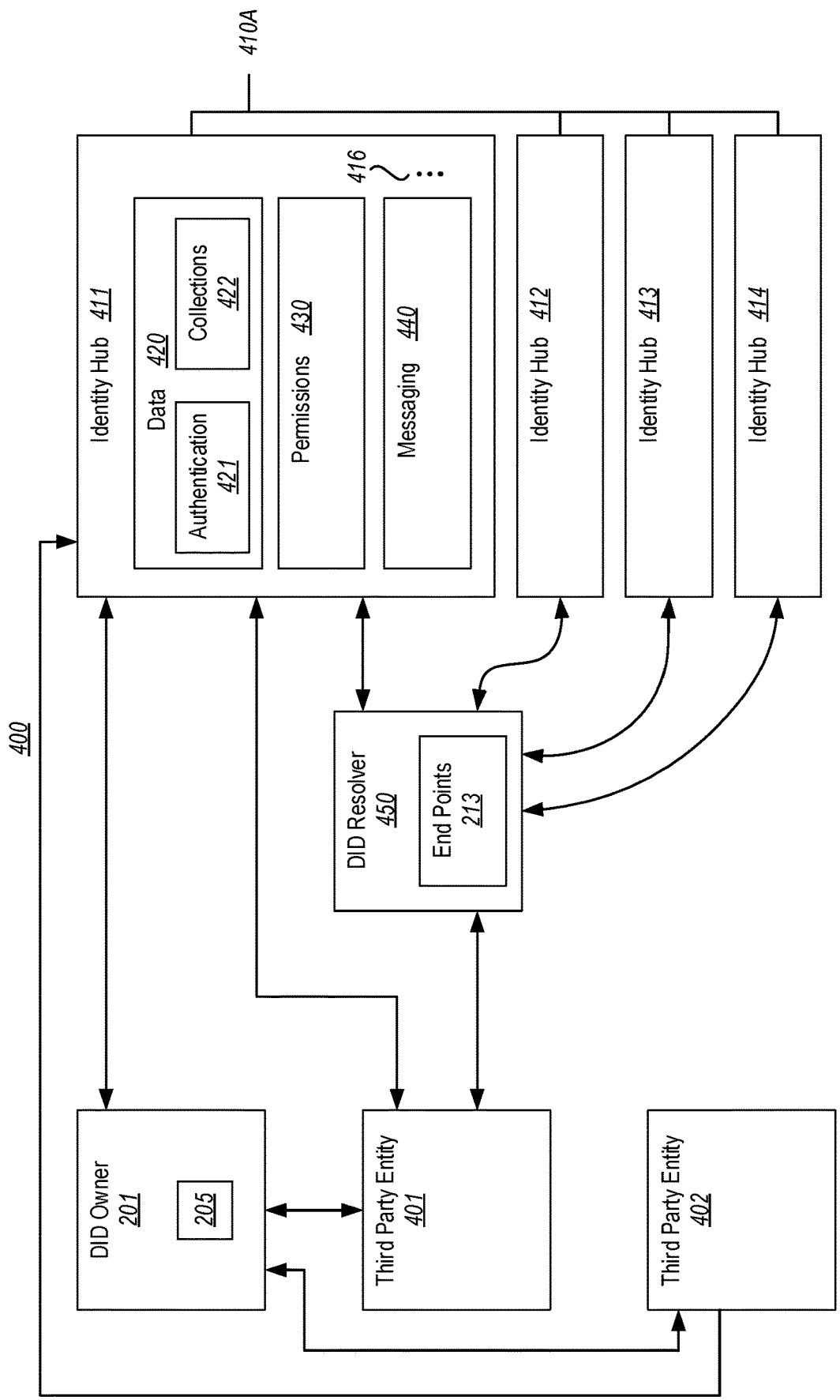
FIG. 4 illustrates an example decentralized storage devices or identity hubs.

FIG. 4 illustrates an embodiment of an environment 400 in which a DID such as DID 205 may be utilized. Specifically, the environment 400 will be used to describe the use of the DID 205 in relation to one or more decentralized storage devices or identity hubs. It will be noted that FIG. 4 may include references to elements first discussed in relation to FIG. 2 or 3 and thus use the same reference numeral for ease of explanation.

As illustrated in FIG. 4, the environment 400 includes various storage devices or identity hubs 410 that are associated with the DID owner 201. For example, the storage devices or identity hubs 410 may include a first identity hub 411, a second identity hub 412, a third identity hub 413, and a fourth identity hub 414. The ellipses 415 represent that that there may be any number of additional storage devices or identity hubs as circumstances warrant. It will be noted that the identity hubs 410 are considered to be decentralized storage devices in that, as will be explained in more detail to follow, the identity hubs are addressable through use of the DID 205 and its corresponding DID document 210. In addition, although the identity hubs may be hosted by a third party, all access to the identity hubs is based on permissions determined by the DID owner 201. The identity hubs 210 may correspond to the database 305 in some embodiments.

In one embodiment, the first identity hub 411 may be implemented at a first cloud storage provider, the second identity hub 412 may be implemented at a second cloud storage provider, the third identity hub 413 may be implemented as part of home computing system, and the fourth identity hub 414 may be implemented as part of a mobile device. Thus, the various identity hubs 410 may be implemented across different service providers such as the two different cloud storage providers. Further, the various identity hubs 410 may be implemented as a combination of storage provided by third parties such as the two cloud storage providers and memory devices owned by DID owner 201 such as the home computing system and mobile device. Of course, the various identity hubs 410 may be implemented as other storage devices and services as circumstances warrant.

In one embodiment, the identity hubs 410 may be multiple instances of the same identity hub. This is represented by the line 410A. Thus, the various identity hubs 410 may include at least some of the same data and services. Accordingly, if any change is made to one of the identity hubs 410, the change may be reflected in the remaining identity hubs. For example, the first identity hub 411 and second identity hub 412 are implemented in cloud storage and thus may be able to hold a large amount of data. Accordingly, a full set of the data may be stored in these identity hubs. However, the identity hubs 412 and 413 may have less memory space. Accordingly, in these identity hubs a descriptor of the data stored in the first and second identity hubs may be included. Alternatively, a record of changes made to the data in other identity hubs may be included. Thus, changes in one of the identity hubs 410 are either fully replicated in the other identity hubs or at least a record or descriptor of that data is recorded in the other identity hubs.

Because the identity hubs may be multiple instances of the same identity hub, only a full description of the first identity hub 411 will provided as this description may also apply to the identity hubs 412-415. As illustrated, identity hub 411 may include data storage 420. The data storage 420 may be used to store any type of data that is associated with the DID owner 201. In one embodiment the data may be a collection 422 of a specific type of data corresponding to a specific protocol. For example, the collection 422 may be medical records data that corresponds to a specific protocol for medical data. The collection 422 may be any other type of data.

In one embodiment, the stored data may have different authentication and privacy settings 421 associated with the stored data. For example, a first subset of the data may have a setting 421 that allows the data to be publically exposed, but that does not include any authentication to the DID owner 201. This type of data may be for relatively unimportant data such as color schemes and the like. A second subset of the data may have a setting 421 that that allows the data to be publically exposed and that includes authentication to the DID owner 201. A third subset of the data may have a setting 421 that encrypts the subset of data with the private key 206 and public key 207 pair (or some other key pair) associated with the DID owner 201. This type of data will require a party to have access to the public key 207 or to some other associated public key in order to decrypt the data. This process may also include authentication to the DID owner 201. A fourth subset of the data may have a setting 421 that restricts this data to a subset of third parties. This may require that public keys associated with the subset of third parties be used to decrypt the data. For example, the DID owner 201 may cause the setting 421 to specify that only public keys associated with friends of the DID owner 201 may decrypt this data.

In some embodiments, the identity hub 411 may have a permissions module 430 that allows the DID owner 201 to set specific authorization or permissions for third parties such as third parties 401 and 402 to access the identity hub. For example, the DID owner 201 may provide access permission to his or her spouse to all the data 420. Alternatively, the DID owner 201 may allow access to his or her doctor for any medical records. It will be appreciated that the DID owner 201 may permission to any number of third parties to access a subset of the data 420. This will be explained in more detail to follow.

The identity hub 411 may also have a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipses 416 represent that the identity hub 411 may have additional services as circumstances warrant.

In one embodiment, the DID owner 201 may wish to authenticate a new device 301 with the identity hub 411 that is already associated with the DID 205 in the manner previously described. Accordingly, the DID owner 201 may utilize the DID management module 320 associated with the new user device 301 to send a message to the identity hub 411 asserting that the new user device is associated with the DID 205 of the DID owner 201.

However, the identity hub 411 may not initially recognize the new device as being owned by the DID owner 201. Accordingly, the identity hub 411 may use the messaging module 440 to contact the DID resolver 450. The message sent to the DID resolver 450 may include the DID 205.

The DID resolver 450 may be a service, application, or module that is configured in operation to search the distributed ledger 220 for DID documents associated with DIDs. Accordingly, in the embodiment the DID resolver 450 may search the distributed ledger 220 using the DID 205, which may result in the DID resolver 450 finding the DID document 210. The DID document 210 may then be provided to the identity hub 411.

As discussed previously, the DID document 210 may include a public key 208 or 209 that is associated with the new user device 301. To verify that the new user device is owned by the DID owner 201, the identity hub 411 may provide a cryptographic challenge to the new user device 301 using the messaging module 440. This cryptographic challenge will be structured such that only a device having access to the private key 206 will be able to successfully answer the challenge In the embodiment, since the new user device is owned by DID owner 201 and thus has access to the private key 206, the challenge may be successfully answered. The identity hub 411 may then record in the permissions 430 that the new user device 301 is able to access the data and services of the identity hub 411 and also the rest of the identity hubs 210.

It will be noted that this process of authenticating the new user device 301 was performed without the need for the DID owner 201 to provide any username, password or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 may provide the DID 205 to the third party entity 401 so that the third party may access data or services stored on the identity hub 411. For example, the DID owner 201 may be a human who is at a scientific conference who desires to allow the third party 401, who is also a human, access to his or her research data. Accordingly, the DID owner 201 may provide the DID 205 to the third party 401.

Once the third party 401 has access to the DID 205, he or she may access the DID resolver 450 to access the DID document 210. As previously discussed, the DID document 210 may include an end point 213 that is an address or pointer to the identity hub 411. The third party 401 may then use the address or pointer to access the identity hub 411.

The third party 401 may send a message to the messaging module 440 asking for permission to access the research data. The messaging module 440 may then send a message to the DID owner 201 asking if the third party 401 should be given access to the research data. Because the DID owner desires to provide access to this data, the DID owner 201 may allow permission to the third party 401 and this permission may be recorded in the permissions 430.

The messaging module 440 may then message the third party 401 informing the third party that he or she is able to access the research data. The identity hub 411 and the third party 401 may then directly communicate so that the third party may access the data. It will be noted that in many cases, it will actually be an identity hub associated with the third party 401 that communicates with the identity hub 411. However, it may a device of the third party 401 that does the communication.

Advantageously, the above described process allows the identity hub 411 and the third party 401 to communicate and to share the data without the need for the third party to access the identity hub 411 in the conventional manner. Rather, the communication is provisioned in the decentralized manner using the DID 205 and the DID document 210. This advantageously allows the DID owner to be in full control of the process.

As shown in FIG. 4, the third party 402 may also request permission for access to the identity hub 411 using the DID 205 and the DID document 210. Accordingly, the embodiments disclosed herein allow access to any number of third parties to the identity hubs 210.

Persona Selection Using Trust Scoring

As mentioned above, in some embodiments the DID owner 201 may generate any number of DIDs along with their accompanying DID documents. Each of the DIDs and corresponding DID documents may have similarities to DID 205 and DID document 210. As also mentioned, each of the DIDS and corresponding DID documents may represent a different persona of the DID owner 201 for different purposes. For instance, a persona may be semi-anonymous, e.g., the DID owner 201 may include a pen name in the DID document when identifying him or her as a writer posting articles on a blog; a persona may be fully anonymous, e.g., the DID owner 201 may only want to disclose his or her job title or other background data (e.g., a school teacher, an FBI agent, an adult older than 21 years old, etc.) but not his or her name in the DID document or may even include made-up information; and a persona may be non-anonymous, e.g., the DID owner 201 may disclose fully identifiable information such as full name, address, and other information that is generally provided to fully establish the identity of the DID owner 201.

Figure 5:
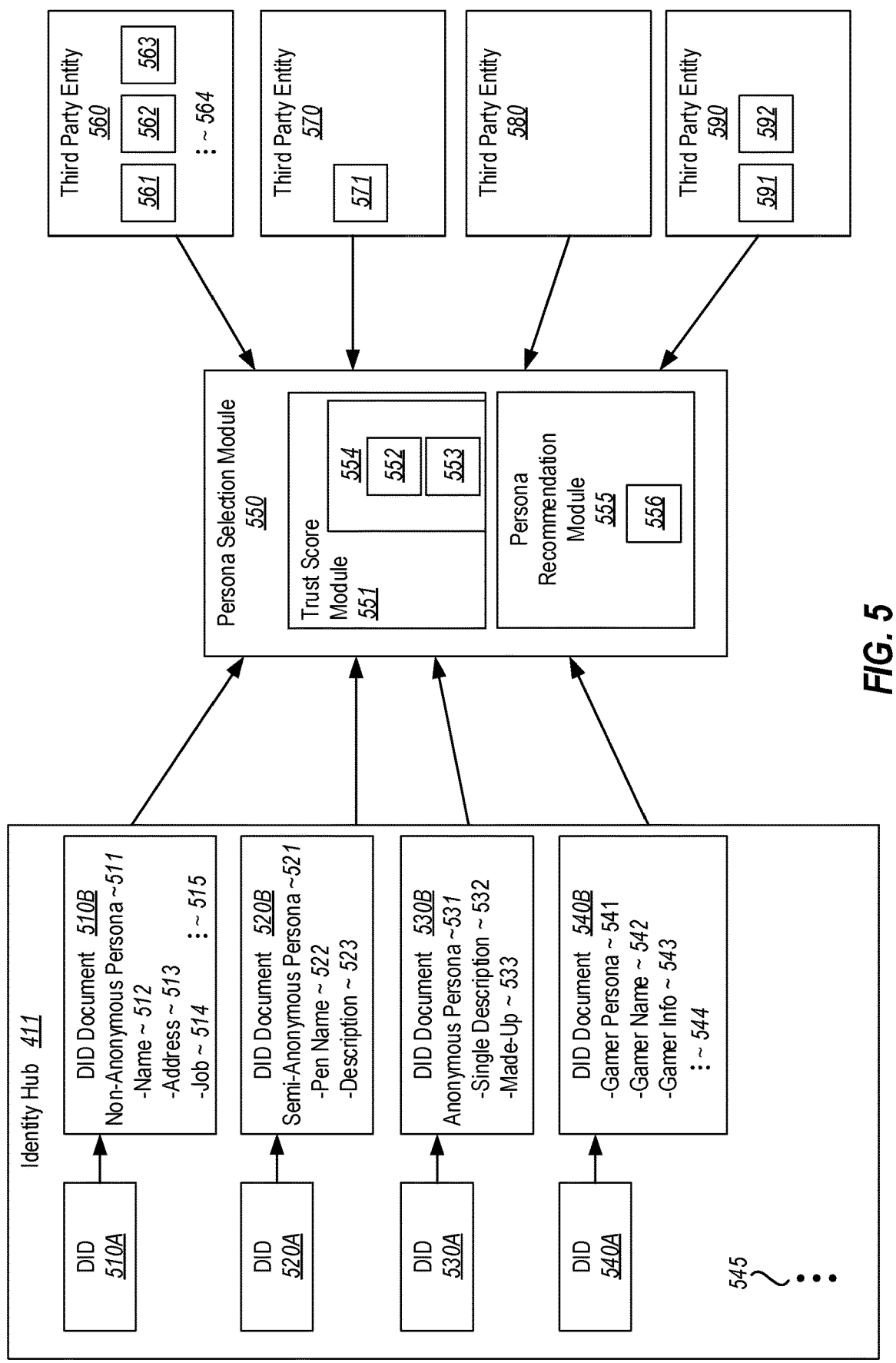
FIG. 5 illustrates an example environment for selecting a persona based on a trust score.

FIG. 5 illustrates an example environment for selecting a persona based on a trust score. FIG. 5 shows an alternative embodiment of the identity hub 411. Accordingly, the identity hub 411 illustrated in FIG. 5 may include the elements previously discussed in relation to FIG. 4. However, in addition to any of the elements previously discussed, the identity hub 411 may include the various DIDs and corresponding DID documents that each represent a different persona for the DID owner 201. It will be appreciated that the various DIDs and corresponding DID documents shown as being stored in the identity hub 411 may also be stored in other storage databases such as the database 305 or some other reasonable storage database.

For example, the identity hub 411 may include a DID 510A and its corresponding DID document 510B. In the embodiment, the DID 510A and DID document 510B may define a non-anonymous persona 511 that discloses a large amount of identifying information about the DID owner 201. For example, the non-anonymous persona 511 may disclose a name 512, an address 513, and a job description 514 of the DID owner 201. The non-anonymous persona 511 may also include any amount of additional identifying information for the DID owner 201 as illustrated by the ellipses 515.

The identity hub 411 may also include a DID 520A and its corresponding DID document 520B. In the embodiment, the DID 520A and DID document 520B may define a semi-anonymous persona 521 that discloses only a small amount of identifying information about the DID owner 201 that does not fully revel the identification of the DID owner 201. The small of amount of identifying information may be focused on a specific aspect of the DID owner 201. For example, the semi-anonymous persona 521 may include a pen name 522 that is specific to a description 523 of the DID owner 201. For instance, as described above, the DID owner 201 may be a blog writer as a description 523 and so may have a pen name 522 that is related to being a blog writer. Of course, the semi-anonymous persona 521 may include other limited identifying information such as only a job title.

The identity hub 411 may also include a DID 530A and its corresponding DID document 530B. In the embodiment, the DID 530A and DID document 530B may define a fully anonymous persona 531 that discloses little or no identifying information about the DID owner 201. For example, the fully anonymous persona 531 may only include a single description 532 about the DID owner 201, such as job title or other background data (e.g., a school teacher, an FBI agent, an adult older than 21 years old) that is unlikely to be able to fully identify the DID owner 201 since the single description applies to many entities. Alternatively, the fully anonymous persona 531 may include made-up information 533 such as a made up name or other related information that may be used so that it is very hard to determine the identity of the DID owner 201.

The identity hub 411 may further include a DID 540A and its corresponding DID document MOB. In the embodiment, the DID 540A and DID document 540B may define a persona 541 based on a specific activity or the like of the DID owner 201. For example, the persona 541 may be a gamer persona that is related to the fact that the DID owner 201 plays online games. Accordingly, the gamer persona 541 may include a gamer name 542 and gamer information 543 that used by the DID owner 201 when he or she is playing online games. The gamer persona 541 may also include other game related information as illustrated by ellipses 544.

The ellipses 545 represent that the identity hub 411 may include any number of additional personas for the DID owner 201. Accordingly, the embodiments disclosed herein are not limited by the number or types of personas for the DID owner 201.

As mentioned previously, various third party entities may make requests from the identity hub 411 for data or other services. However, based on the type of request or the identity of the third party entity making the request, a particular one of the various personas of the DID owner 201 may be more appropriate to represent the DID owner 201 than other of the personas. Accordingly, embodiments disclosed herein provide for a persona selection module 550, which may be part of the DID management module 320 or may be part of another service such as an attestation module related to the DID owner 201.

In some embodiments, the persona selection module 550 may include a trust score module 551. The trust score module 551 may analyze the request for data or services from various third party entities 560-590. The trust score module 551 may assign a trust score 552 or 553 for each of the third party entities and store them in a table 554. As will be explained in more detail to follow, the trust scores 552 or 553 may be based on how trustworthy the identity of the third party entity making the request is and/or how reputable the third party entity is. For example, if the third party entity has a high reputation and/or its identity is verifiable, then the trust score module 551 may assign a relatively high trust score 552 or 553. However, if the third party entity has a low reputation and/or its identity is hard to verify, then the trust score module 552 may assign a relatively low trust score 552 or 553. For third party entities that have a neutral reputation and/or that perhaps have an identity that is only partially verifiable, then the trust score module 552 may assign a middle range trust score 552 or 553.

The persona selection module 550 may also include a persona recommendation module 555. In operation, the persona recommendation module 555 may use the trust score 552 or 553 to determine which of the various personas 511, 521, 531, or 541 would be best to use when responding to the request from the third party entity. Alternatively, in some embodiments the persona recommendation module 555 may recommend which of the various personas 511, 521, 531, or 541 would be best to use based on a specific purpose of the request in addition to or instead of using the trust score.

The operation of the persona selection module 550 will now be described with respect to requests made from the third party entities 560-590. In one embodiment, a request for data or services may be received from the third party entity 560. The third party entity 560 may be a bank, university, well known company or other reputable entity that may have business with the DID owner 201. The third party entity 560 may have an associated DID and DID document that include a number of attestations 561, 562, 563, and any number of additional attestations illustrated by the ellipses 564. In an embodiment, an attestation may be a signed validation or verified credential associated with the DID of the third party 560 (or simply associated with the third party if the third party entity has not DID) that attests to the identity of the third party entity 560. Accordingly, the larger number of attestations associated with a third party entity, the more trustworthy or verifiable the identity of the third party entity is.

The trust score module 551 may analyze the request from the third party 560. In this case, the third party entity 560 includes a large number of attestations and so its identity is easily verifiable since the large number of attestations attest to the identity. In addition, the third party entity is a reputable organization. Accordingly, the trust score module 551 may assign a high trust score 552.

The persona recommendation module 555 may then access the high trust score 552 for the third party entity 560. Because the third party entity has the high trust score 552 and because it is an organization that would normally do business with the DID owner 201, the persona recommendation module 555 may recommend that the DID 510A and corresponding DID document 510B that are associated with the non-anonymous persona 511 be used for interactions with the third party entity 560. That is, the persona recommendation module 555 may recommend the non-anonymous persona 511 since this persona is the most likely to be appropriate for the interactions with the third party entity 560.

In another embodiment, a request for data or services may be received from the third party entity 570. As shown third party entity 570 may have an associated DID and DID document that only includes a single attestation 571 that identifies the third party entity 570 as being a particular blog. Accordingly, the trust score module 551 may assign a mid-level or neutral trust score 552 to the third entity 570.

The persona recommendation module 555 may then access the mid-level or neutral trust score 552. Based on this trust score and the fact that the third party entity 570 appears to be a blog, the persona recommendation module 555 may recommend that the DID 520A and corresponding DID document 520B that are associated with the semi-anonymous persona 521 be used for interactions with the third party entity 570. That is, since the semi-anonymous persona 521 is related to the DID owner 201 being the writer of a blog, the semi-anonymous persona 521 is the most appropriate persona to use in interacting with the third party entity 570.

In another embodiment, a request for data or services may be received from the third party entity 580. As shown third party entity 580 may have an associated DID and DID document that do not include any attestations. Accordingly, the trust score module 551 may assign a low trust score 552 to the third entity 570.

The persona recommendation module 555 may then access the low trust score 552. Based on this trust score, the persona recommendation module 555 may recommend that the DID 530A and corresponding DID document 530B that are associated with the anonymous persona 531 be used for interactions with the third party entity 580. Since the identity of the third party 580 is not known, it is unlikely that the DID owner 201 would want to interact with this entity using a persona that provided a large amount of identity information about the DID owner. Accordingly, the anonymous persona 531 is appropriate for interactions with the third party entity 580 since this persona will give away very little identity information that could be used in a hostile manner by the entity 580. Thus, the anonymous persona 531 may be considered a "throw away" persona since there will be little harm that comes to the DID owner 201 if the anonymous persona 531 is used by the third party entity (or any other entity) 580 in a hostile manner. This is especially true if the anonymous persona 531 includes the made-up information 533, since this information will have no effect on the DID owner 201 if it is used in the hostile manner.

In another embodiment, a request for data or services may be received from the third party entity 590. As shown third party entity 590 may have an associated DID and DID document that only includes attestations 591 and 592 that identify the third party entity 590 as being associated with online gaming. Accordingly, the trust score module 551 may assign a mid-level or neutral or high trust score 552 to the third entity 590.

The persona recommendation module 555 may then access the mid-level or high trust score 552. Based on this trust score and the fact that the third party entity 590 appears to be associated with online gaming, the persona recommendation module 555 may recommend that the DID 540A and corresponding DID document 540B that are associated with the gaming persona 541 be used for interactions with the third party entity 590. That is, since the gaming persona 541 is related to the DID owner 201 playing online games, the gaming persona 541 may be the most appropriate persona to use in interacting with the third party entity 5790.

The recommendation of the persona recommendation module 555 regarding the appropriate personal 511, 521, 531, or 541 to use may be provided to the DID management module 320. This may allow the DID owner 201 to select the recommended persona or to select a different persona to use. The recommended persona (or the different persona if selected) and its associated DID and DID document may then be used for any further interactions with the third party entity.

This represents a technical advance over existing systems as the DID owner no longer needs to determine which persona would be the best to use for interaction with a given third party entity. Instead the persona selection module 560 is able to generate the trust score in the manner previously explained based on the verification of the identity of the third party and/or the purpose of the request. The persona selection module 560 is then able to recommend the most appropriate persona to use for interacting with the third party entity. Thus, the DID owner need only accept the recommendation and does not need to make the selection. This may help prevent a persona that is not the most appropriate from being used for the interaction.

In some embodiments, the personal recommendation module 555 may have an automatic module 556. In operation, the automatic module 556 may automatically select those personas with a high trust score for use without the need to wait for the DID owner 201 to accept the recommendation. Thus, for those third party entities that have a high enough trust score, the automatic module 556 may efficiently move forward with the selection of the most appropriate persona since the high trust score indicates that there is little risk to the DID owner 201 that the third party entity is hostile.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
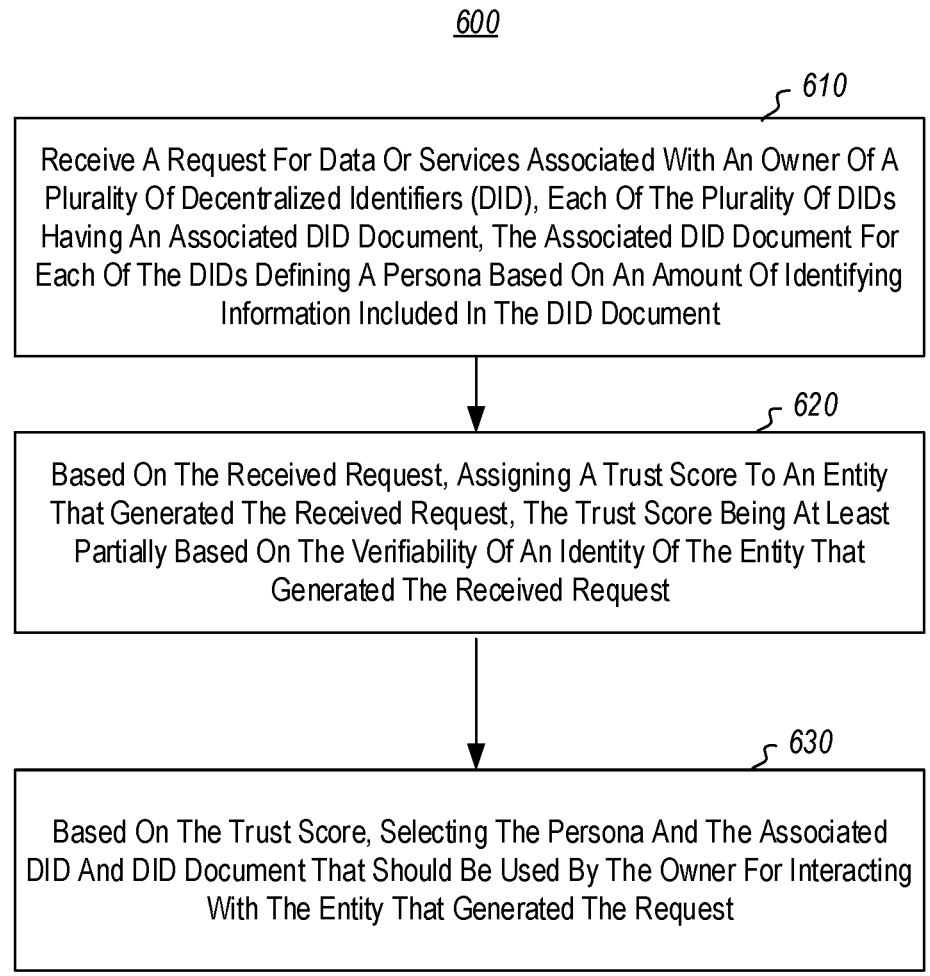
FIG. 6 illustrates a flow chart of an example method for selecting a persona for a DID and associated DID document based on a trust score.

FIG. 6 illustrates a flow chart of an example method 600 for selecting a persona for a Decentralized Identifier (DID) and associated DID document based on a trust score. The method 600 will be described with respect to one or more of FIGS. 2-5 discussed previously.

The method 600 includes receiving a request for data or services associated with an owner of a plurality of decentralized identifiers (DID) (610). Each of the plurality of DIDs may have an associated DID document, the associated DID document for each of the DIDs defining a persona based on an amount of identifying information included in the DID document. For example, as previously described the one of the third party entities 560-590 may request data or services associated with the DID owner 201. The DID owner 201 may own the DIDs 510A, 520A, 530A, and 540A and their respective DID documents 510B, 520B, 530B, and 540B.

As also discussed, the DID document 510B may define the non-anonymous persona 511 since the DID document includes a large amount of identifying information 512-515 about the DID owner 201. The DID document 520B may define the semi-anonymous persona 521 since the DID document includes a small amount of identifying information 522-523 about the DID owner 201. The DID document 530B may define the anonymous persona 511 since the DID document includes little (e.g., 532) or no identifying information about the DID owner 201 or alternatively incudes the made-up information 533. The DID document 540B may define the gamer persona 541 since the DID document includes a gaming information 543-544 that is related to a specific activity about the DID owner 201, in this case online gaming.

The method 600 includes, based on the received request, assigning a trust score to an entity that generated the received request (620). The trust score is at least partially based on the verifiability of an identity of the entity that generated the received request. For example, as previously described the trust score module 551 may assign the trust scores 552 or 553 to third party entities 560-590. The trust score may be based on the variability of the identity of the third party entities.

For instance, the third party entity 560 may be assigned a high trust score since it has a large number of associated attestations 561-564. The third party entity 570 may be assigned a mid-level or neutral trust score since it has a small amount of associated attestations 571. The third party entity 580 may be assigned a low trust score since it has no associated attestations.

The method 600 includes based on the trust score, selecting the persona and the associated DID and DID document that should be used by the owner for interacting with the entity that generated the request (630). For example, the persona recommendation module 555 may recommend to the DID owner 201 which of the personas 511, 521, 531, and 541 and their associated DIDs and DID documents should be used in further interactions with the third party entities in the manner previously described.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
    one or more processors; and
    one or more computer-readable hardware storage devices having thereon computer-executable instructions that are executable by the one or more processors for configuring the computing system to:
        receive a request for data or services associated with an owner of a plurality of decentralized identifiers (DID), each of the plurality of DIDs having an associated DID document, the associated DID document for each of the DIDs defining a persona based on an amount of identifying information included in the DID document;
        based on the received request, assigning a trust score to an entity that generated the received request, the trust score being at least partially based on the verifiability of an identity of the entity that generated the received request; and
        based on the trust score, selecting the persona and the associated DID and DID document that should be used by the owner for interacting with the entity that generated the request.

2. The computing system in accordance with claim 1, wherein the selected persona will be the persona associated with the DID document that includes identifying information that is suited for the type of the request that was received.

3. The computing system in accordance with claim 1, wherein the computer-executable instructions that are structured to further cause the computing system to:
    provide a recommendation to the owner to use the selected persona and associated DID and DID document; and
    upon the owner agreeing to the recommendation, using the selected persona and associated DID and DID document in further interactions with the entity that generated the request.

4. The computing system in accordance with claim 1, wherein the assigned trust score is a high trust score, a neutral trust score, or a low trust score.

5. The computing system in accordance with claim 4, wherein the high trust score is assigned when the entity that generated the received request has associated information to verify the identity of the entity.

6. The computing system in accordance with claim 5, wherein the low trust score is assigned when the entity that generated the received request omits the associated information to verify the identity of the entity.

7. The computing system in accordance with claim 5, wherein the neutral trust score is assigned when the entity that generated the received request has only a limited portion of the associated information to verify the identity of the entity.

8. The computing system in accordance with claim 1, wherein received request includes information related to a specific activity and the selected persona includes identifying information related to the specific activity.

9. The computing system in accordance with claim 8, wherein the specific activity is related to online gaming.

10. The computing system in accordance with claim 1, wherein the assigned trust score is a high trust score, wherein the selected persona is a non-anonymous persona, and wherein the DID document associated with the non-anonymous persona includes a large amount of information that identifies the owner of the DID associated with the DID document.

11. The computing system in accordance with claim 1, wherein the assigned trust score is a low trust score, wherein the selected persona is an anonymous persona, and wherein the DID document associated with the anonymous persona includes little or no information that identifies the owner of the DID associated with the DID document or includes made-up information about the owner of the DID.

12. The computing system in accordance with claim 1, wherein the assigned trust score is a mid-level or neutral score, wherein the selected persona is a semi-anonymous persona, and wherein the DID document associated with the semi-anonymous persona includes a small amount of information that identifies the owner of the DID associated with the DID document.

13. The computing system in accordance with claim 1, wherein the computer-executable instructions are further executable for configuring the computing system to:
    automatically, without asking for the owner's agreement, using the selected persona and associated DID and DID document in further interactions with the entity that generated the request when the assigned trust score is a high trust.

14. A method for selecting a persona for a Decentralized Identifier (DID) and associated DID document based on a trust score, the method comprising:
    receiving a request for data or services associated with an owner of a plurality of decentralized identifiers (DID), each of the plurality of DIDs having an associated DID document, the associated DID document for each of the DIDs defining a persona based on an amount of identifying information included in the DID document;
    based on the received request, assigning a trust score to an entity that generated the received request, the trust score being at least partially based on the verifiability of an identity of the entity that generated the received request; and
    based on the trust score, selecting the persona and the associated DID and DID document that should be used by the owner for interacting with the entity that generated the request.

15. The method in accordance with claim 14, wherein the assigned trust score is a high trust score, a neutral trust score, or a low trust score.

16. The method in accordance with claim 15, wherein the high trust score is assigned when the entity that generated the received request has associated information to verify the identity of the entity.

17. The method in accordance with claim 16, wherein the low trust score is assigned when the entity that generated the received request omits the associated information to verify the identity of the entity.

18. The method in accordance with claim 16, wherein the neutral trust score is assigned when the entity that generated the received request has a only a limited portion of the associated information to verify the identity of the entity.

19. The method in accordance with claim 15, wherein received request includes information related to a specific activity and the selected persona includes identifying information related to the specific activity.

20. A computer program product comprising one or more computer-readable hardware storage devices having thereon computer-executable instructions that are executable by one or more processors of a computing system for configuring the computing system to select a persona for a Decentralized Identifier (DID) and associated DID document based on a trust score and by at least configuring the computing system to perform the following:
    receive a request for data or services associated with an owner of a plurality of decentralized identifiers (DID), each of the plurality of DIDs having an associated DID document, the associated DID document for each of the DIDs defining a persona based on an amount of identifying information included in the DID document;
    based on the received request, assign a trust score to an entity that generated the received request, the trust score being at least partially based on the verifiability of an identity of the entity that generated the received request; and
    based on the trust score, select the persona and the associated DID and DID document that should be used by the owner for interacting with the entity that generated the request.

* * * * *